United States Patent
Jung et al.

(10) Patent No.: US 9,497,695 B2
(45) Date of Patent: Nov. 15, 2016

(54) OPERATION METHOD FOR SEARCHING FOR CELL IN WIRELESS COMMUNICATION SYSTEM AND DEVICE SUPPORTING SAME

(71) Applicant: LG ELECTRONICS INC., Seoul (KR)

(72) Inventors: Sunghoon Jung, Anyang-si (KR); Youngdae Lee, Anyang-si (KR); Sungjun Park, Anyang-si (KR); Seungjune Yi, Anyang-si (KR); Sangwon Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 3 days.

(21) Appl. No.: 14/395,934

(22) PCT Filed: Apr. 29, 2013

(86) PCT No.: PCT/KR2013/003670
§ 371 (c)(1),
(2) Date: Oct. 21, 2014

(87) PCT Pub. No.: WO2013/162342
PCT Pub. Date: Oct. 31, 2013

(65) Prior Publication Data
US 2015/0133115 A1    May 14, 2015

Related U.S. Application Data

(60) Provisional application No. 61/639,106, filed on Apr. 27, 2012.

(51) Int. Cl.
*H04W 4/00* (2009.01)
*H04W 48/16* (2009.01)

(52) U.S. Cl.
CPC ................................. *H04W 48/16* (2013.01)

(58) Field of Classification Search
CPC .................................................... H04W 48/16
(Continued)

(56) References Cited

U.S. PATENT DOCUMENTS

| 2011/0070867 | A1  | 3/2011 | Venkatachalam et al. |
| 2011/0205964 | A1* | 8/2011 | Fix et al. ...................... 370/328 |
| 2012/0214527 | A1* | 8/2012 | Meylan et al. ............... 455/509 |

FOREIGN PATENT DOCUMENTS

| KR | 10-2007-0049716 | 5/2007 |
| KR | 10-2010-0088085 | 8/2010 |
| KR | 10-2011-0093613 | 8/2011 |

OTHER PUBLICATIONS

PCT International Application No. PCT/KR2013/003670, Written Opinion of the International Searching Authority dated Jul. 4, 2013, 1 page.

\* cited by examiner

*Primary Examiner* — Nader Bolourchi
(74) *Attorney, Agent, or Firm* — Lee Hong Degerman Kang & Waimey

(57) ABSTRACT

Provided is an operation method for sensing a cell which is performed by a terminal in a wireless communication system. The operation method comprises: obtaining wireless fingerprint information from a network; obtaining an intra-frequency measurement result by performing an intra-frequency measurement; evaluating a correlation on the basis of the wireless fingerprint information and the intra-frequency measurement result; and determining whether or not to search for a cell on the basis of the evaluation result on the correlation.

18 Claims, 15 Drawing Sheets

OPERATION METHOD FOR SEARCHING FOR CELL IN WIRELESS COMMUNICATION SYSTEM AND DEVICE SUPPORTING SAME

CROSS-REFERENCE TO RELATED APPLICATIONS

This application is the National Stage filing under 35 U.S.C. 371 of International Application No. PCT/KR2013/003670, filed on Apr. 29, 2013, which claims the benefit of U.S. Provisional Application Ser. No. 61/639,106, filed on Apr. 27, 2012, the contents of which are hereby incorporated by reference herein in their entirety.

BACKGROUND OF THE INVENTION

1. Field of the Invention

The present invention relates to wireless communication, and more particularly, to an operation method for searching for a cell in a wireless communication system and a device for supporting the same.

2. Related Art

3GPP (3rd Generation Partnership Project) LTE (long term evolution) which is improvement of UMTS (Universal Mobile Telecommunications System) has been introduced as 3GPP release 8. The 3GPP LTE uses OFDMA (orthogonal frequency division multiple access) in a downlink, and uses SC-FDMA (Single Carrier-frequency division multiple access) in an uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

A micro cell, a femto cell, a pico cell, and the like which have small service areas may be installed at a predetermined position of a macro cell having wide coverage. As such, a network in which the macro cell and the small cells coexist may be called a heterogeneous network. Traffic that may be concentrated in the macro cell may be offloaded to the small cells through the small cells installed in the coverage of the macro cell. This may reduce the load for the macro cell and increase capacity of the network.

User equipment in such a network is positioned in the coverage of the macro cell, and may detects small cells in operation at different frequencies and perform measurement of the detected small cells. The user equipment may use a measurement gap in order to perform inter-frequency measurement, and the use of the measurement gap may cause service interruption. In a heterogeneous network environment, a lot of small cells may exit in the coverage of the macro cell, and performing the measurement for all the small cells causes the service interruption, and as a result, the quality of the service provided to the user equipment may seriously deteriorate.

SUMMARY OF THE INVENTION

The present invention has been made in an effort to provide an operation method for searching for a cell in a wireless communication system and a device for supporting the same.

In as aspect, provided is an operation method for sensing a cell performed by UE in a wireless communication system. The method includes: acquiring wireless fingerprint information from a network; acquiring an intra-frequency measurement result by performing intra-frequency measurement; evaluating a correlation based on the wireless fingerprint information and the intra-frequency measurement result; and determining whether to search for the cell based on an evaluation result for the correlation.

The wireless fingerprint information may include a cell identity list, a detection threshold, a correlation threshold, and a target frequency list.

The evaluating of the correlation may include weighted-summing the number of cells which are included in both the intra-frequency measurement result and the cell identity list and in which the corresponding measurement result is larger than the detection threshold, and determining that the correlation is high when the weighted-summation value is larger than the correlation threshold. The determining of searching for the cell may include determining to search for the cell when it is determined that the evaluated correlation is high.

The evaluating of the correlation may include weighted-summing difference values between at least one measurement quality for at least one cell indicated by the cell identity and a specific reference value, and determining that the correlation is high when the weighted-summation value is larger than the correlation threshold. The determining of searching for the cell may include determining to search for the cell when it is determined that the evaluated correlation is high.

The measurement result by the intra-frequency measurement may include a measurement result for all cells indicated by the cell identity. The evaluating of the correlation may include determining that the correlation is high when the measurement result is more than the detection threshold. The determining of searching for the cell may include determining to search for the cell when it is determined that the evaluated correlation is high.

The measurement result by the intra-frequency measurement may include a measurement result for at least one cell among cells indicated by the cell identity. The evaluating of the correlation includes determining that the correlation is high when a measurement result for N or more cells among one or more cells is more than the detection threshold. The N may be an integer of 1 or more. The determining of searching for the cell may include determining to search for the cell when it is determined that the evaluated correlation is high.

The detection threshold may be configured by at least one threshold individually applied to at least one cell included in the cell identity list.

The detection threshold may be configured by a single threshold commonly applied to at least one cell included in the cell identity list.

The performing of searching for the cell may include performing inter-frequency measurement for at least one frequency indicated by the target frequency list of the wireless fingerprint.

In another aspect, provided is a wireless device that operates in a wireless communication system. The wireless device includes: a radio frequency (RF) unit which transmits and receives a radio signal; and a processor which operates in functional association with the RF unit. The processor may be configured to acquire wireless fingerprint information from a network; acquire an intra-frequency measurement result by performing intra-frequency measurement; evaluate a correlation based on the wireless fingerprint information and the intra-frequency measurement result; and determine whether to search for the cell based on an evaluation result for the correlation.

The present invention proposes a method that determines to discover the cell at the inter-frequency based on the intra-frequency measurement to perform the inter-frequency measurement. Under a network environment in which traffics are preferably off-loaded to the small cell which is being operated at the inter-frequency, the number of times of performing the inter-frequency measurement required for sensing the small cell may be optimized according to the present invention. The service interruption which may occur due to the measurement gap applied for the inter-frequency measurement is reduced through such an operation to thereby improve a service quality provided to the UE.

DESCRIPTION OF EXEMPLARY EMBODIMENTS

Figure 1:
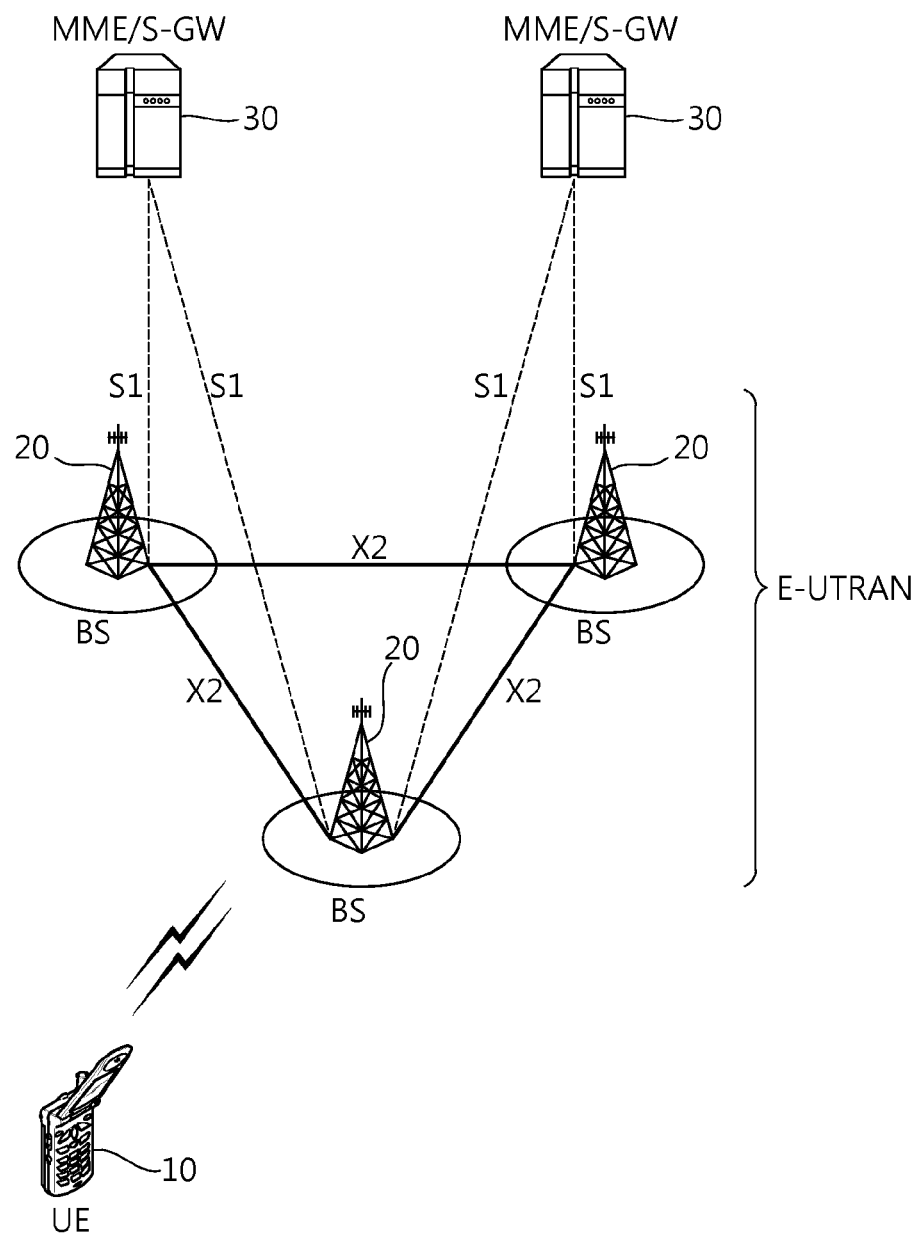
FIG. 1 illustrates a wireless communication system to which the present invention is applied.

FIG. 1 illustrates a wireless communication system to which the present invention is applied. The wireless communication system may be called an evolved-UMTS terrestrial radio access network (E-UTRAN), or a long term evolution (LTE)/LTE-A system.

The E-UTRAN includes a base station (BS) 20 which provides a control plane and a user plane to user equipment (UE) 10. The UE 10 may be fixed or have mobility, and may be referred to as other terms such as a mobile station (MS), a user terminal (UT), a subscriber station (SS), a mobile terminal (MT), and a wireless device. The BS 20 generally represents a fixed station that communicates with the UE 10 and may be referred to as other terms such as an evolved-NodeB (eNB), a base transceiver system (BTS), and an access point.

The BSs 20 may be connected to each other through an X2 interface. The BS 20 is connected with an evolved packet core (EPC) 30 through an S1 interface, and more particularly, connected with a mobility management entity (MME) through an S1-MME and a serving gateway (S-GW) through an S1-U.

The EPC 30 is constituted by the MME, the S-GW, and a packet data network-gateway (P-GW). The MME has access information of the UE or information regarding capacity of the UE, and the information is frequently used in mobility management of the UE. The S-GW is a gateway having the E-UTRAN as an end point, and the P-GW is a gateway having the PDN as an end point.

Layers of a radio interface protocol between the UE and the network may be divided into a first layer L1, a second layer L2, and a third layer L3 based on three lower layers of an open system interconnection (OSI) standard model which is widely known in the communication system, and among them, a physical layer to which the first layer belongs provides an information transfer service using a physical channel, and a radio resource control (RRC) layer positioned on the third layer serves to control a radio resource between the UE and the network. To this end, the RRC layer exchanges an RRC message between the UE and the network.

Figure 2:
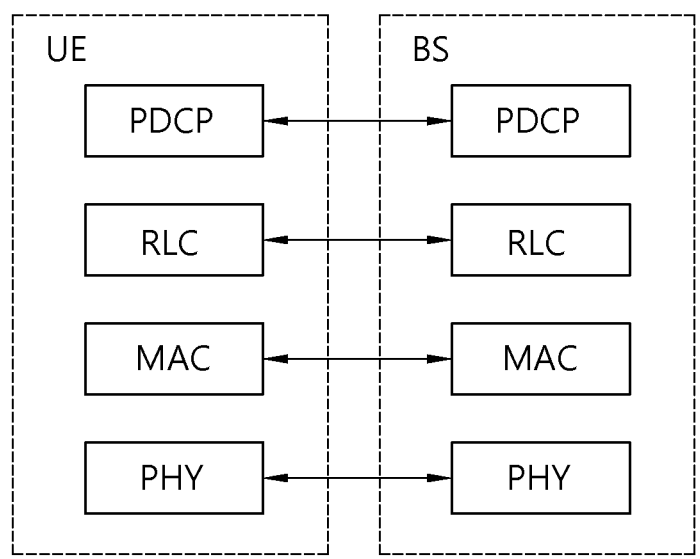
FIG. 2 is a block diagram illustrating a radio protocol architecture for a user plane.
Figure 3:
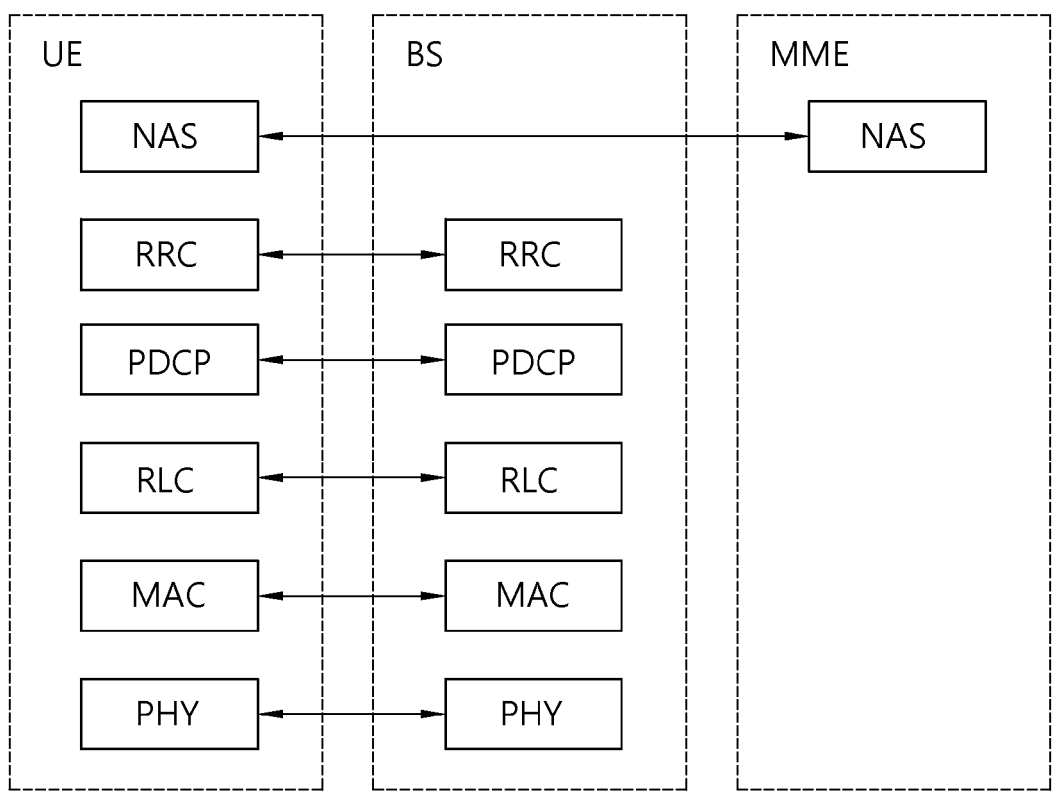
FIG. 3 is a block diagram illustrating a radio protocol architecture for a control plane.

FIG. 2 is a block diagram illustrating a radio protocol architecture for a user plane. FIG. 3 is a block diagram illustrating a radio protocol architecture for a control plane. The user plane is a protocol stack for user data transmission, and the control plane is a protocol stack for control signal transmission.

Referring to FIGS. 2 and 3, a physical (PHY) layer provides an information transfer service to an upper layer by using a physical channel. The PHY layer is connected with a medium access control (MAC) layer which is the upper layer through a transport channel. Data move between the MAC layer and the PHY layer through the transport channel. The transport channel is classified according to how the data is transmitted through a radio interface with any characteristic.

The data move between different PHY layers, that is, the PHY layers of the transmitter and the receiver through the physical channel. The physical channel may be modulated by an orthogonal frequency division multiplexing (OFDM) scheme, and use a time and a frequency as the radio resource.

A function of the MAC layer includes mapping between a logical channel and a transport channel and multiplexing/demultiplexing to a transport block provided to the physical channel on the transport channel of a MAC service data unit (SDU) which belongs to the logical channel. The MAC layer provides a service to a radio link control (RLC) layer through the logical channel.

A function of the RLC layer includes concatenation, segmentation, and reassembly of the RLC SDU. In order to secure various quality of services (QoS) required by a radio bearer (RB), an RLC layer provides three operation modes of a transparent mode (TM), an unacknowledged mode (UM), and an acknowledged mode (AM). The AM RLC provides an error correction through an automatic repeat request (ARQ).

The radio resource control (RRC) layer is defined only in the control plane. The RRC layer is related with configuration, re-configuration, and release of the RBs to serve to control the logical channel, the transport channel, and the physical channels. The RB means a logic path provided by a first layer (PHY layer) and a second layer (MAC layer, RLC layer, or PDCP layer) in order to transfer the data between the UE and the network.

A function of a packet data convergence protocol (PDCP) layer in the user plane includes transfer, header compression, and ciphering of the user data. A function of the PDCP layer in the control plane includes transfer and ciphering/integrity protection of control plane data.

The configuration of the RB means a process of defining characteristics of the radio protocol layer and the channel in order to provide a specific service and configuring each detailed parameter and operation method. The RB may be divided into a signaling RB (SRB) and a data RB (DRB) again. The SRB is used as a path for transmitting an RRC message in the control plane, and the DRB is used as a path for transporting user data in the user plane.

When RRC connection is established between the RRC layer of the UE and the RRC layer of the E-UTRAN, the UE is in an RRC connected state, and if not, the UE is in an RRC idle state.

A downlink transport channel for transporting the data to the UE from the network includes a broadcast channel (BCH) for transporting system information and a downlink shared channel (SCH) for transporting user traffic or a control message. The traffic or the control message of a downlink multicast or broadcast service may be transported through the downlink SCH, or may be transported through a separate downlink multicast channel (MCH). Meanwhile, an uplink transport channel for transporting the data from the UE to the network includes a random access channel (RACH) for transporting an initial control message and an uplink shared channel (SCH) for transporting the user traffic or the control message in addition to the RACH.

A logical channel which is above the transport channel and mapped in the transport channel includes a broadcast control channel (BCCH), a paging control channel (PCCH), a common control channel (CCCH), a multicast control channel (MCCH), a multicast traffic channel (MTCH), and the like.

The physical channel is constituted by several OFDM symbols in a time domain and several sub-carriers in a frequency domain. One sub-frame is constituted by a plurality of OFDM symbols in the time domain. The RB as a resource allocation unit is constituted by a plurality of OFDM symbols and a plurality of sub-carriers. Further, each sub-frame may use specific sub-carriers of specific OFDM symbols (for example, first OFDM symbols) of the corresponding sub-frame for the physical downlink control channel (PDCCH), that is, a L1/L2 control channel. A transmission time interval (TTI) is a unit time of sub-frame transmission.

Hereinafter, an RRC state of the UE and an RRC connection method will be described.

The RRC state means whether the RRC layer of the UE is logical-connected with the RRC layer of the E-UTRAN or not, and a case where the RRC layer of the UE is connected with the RRC layer of the E-UTRAN is called a RRC connection state, and a case where the RRC layer of the UE is not connected with the RRC layer of the E-UTRAN is called an RRC idle state. Since the RRC connection exists in the UE in the RRC connection state, the E-UTRAN may determine the existence of the corresponding UE in a cell unit, and as a result, the UE may be efficiently controlled. On the other hand, the UE in the RRC idle state may not be determined by the E-UTRAN, and a core network (CN) is managed by a tracking area unit which is a larger area unit than the cell. That is, in the UE in the RRC idle state, only the existence is determined by a large area unit, and the UE needs to move in the RRC connection state in order to receive a general mobile communication service such as voice or data.

When the user first turns on the power of the UE, the UE first searches a proper cell and then stays in the RRC idle state in the corresponding cell. The UE in the RRC idle state establishes the RRC connection with the E-UTRAN through an RRC connection procedure only when the RRC connection is required, and is transited into the RRC connection state. There are several cases where the UE in the RRC idle state requires the RRC connection, and for example, uplink data transmission is required due to reasons such as user's call attempt, or a response message to a case where a paging message is received from the E-UTRAN is transmitted.

A non-access stratum (NAS) layer positioned above the RRC layer performs functions such as a session management and a mobility management.

In the NAS layer, in order to manage mobility of the UE, two states of EDEPS mobility management-REGISTERED (EMM-REGISTER) and EMM-DEREGISTERED are defined, and the two states are applied to the UE and the MME. The initial UE is in the EMM-DEREGISTERED state, and the UE performs a procedure of registering the UE in the corresponding network through an initial attaching procedure so as to be connected to the network. When the attaching procedure is successfully performed, the UE and the MME are in the EMM-REGISTERED state.

In order to manage signaling connection between the UE and the EPS, two states of an EPS connection management (ECM)-IDLE state and an ECM-CONNECTED state, and the two states are applied to the UE and the MME. When the UE in the ECM-IDLE state is RRC-connected with the E-UTRAN, the corresponding UE becomes in the ECM-CONNECTED state. When the MME in the ECM-IDLE state is S1-connected with the E-UTRAN, the corresponding MME becomes in the ECM-CONNECTED state. When the UE is in the ECM-IDLE state, the E-UTRAN does not have context information of the UE. Accordingly, the UE in the ECM-IDLE state performs a procedure related with the mobility based on the UE such as cell selection or cell reselection without receiving a command of the network. On the contrary, when the UE is in the ECM-CONNECTED state, the mobility of the UE is managed by the command of the network. When a position of the UE in the ECM-IDLE state is different from a position which is known to the network, the UE notifies the corresponding position of the UE to the network through a tracking area updating procedure.

Next, the system information will be described.

The system information includes necessary information which the UE needs to known so as to be connected to the BS. Accordingly, the UE needs to receive all the system information before being connected to the BS, and further, needs to have latest system information at all times. In addition, since the system information is information to be known by all the UE in one cell, the BS periodically transmits the system information.

According to section 5.2.2 of 3GPP TS 36.331 V8.7.0 (2009-09) "Radio Resource Control (RRC); Protocol specification (Release 8)", the system information is divided into a master information block (MIB), a scheduling block (SB), and a system information block (SIB). The MIB allows the UE to know a physical configuration of the corresponding cell, for example, a bandwidth. The SB notifies transmission information of the SIBs, for example, a transmission period and the like. The SIB is a set of system information related to each other. For example, any SIB includes only information on a peripheral cell, and any SIB includes only information on an uplink radio channel used in the UE.

Generally, services provided to the UE by the network may be divided into three types to be described below. Further, the UE differently recognizes the cell type according to which service may be provided. First, the services types will be described below, and then the cell types will be described.

1) Limited service: The service provides an emergency call and a earthquake and tsunami warning system (ETWS), and may be provided in an acceptable cell.

2) Normal service: The service means a public use of a general use, and may be provided in a suitable or normal cell.

3) Operator service: The service means a service for a communication network operator, and the cell may be used by only the communication network operator and may not be used by a general user.

In relation to the service type provided by the cell, the cell types may be divided below.

1) Acceptable cell: A cell in which the UE may receive the limited service. The cell is a cell which is not barred and satisfies a cell selection reference of the UE in the corresponding UE.

2) Suitable cell: A cell in which the UE may receive the normal service. The cell satisfies a condition of the acceptable cell and simultaneously satisfies additional conditions. As the additional conditions, the cell needs to belong to a public land mobile network (PLMN) to which the corresponding UE may be connected and be a cell in which the performance of the tracking area updating procedure of the UE is not barred. When the corresponding cell is a CSG cell, the UE needs to be a cell to be connected to the corresponding cell as the CSG member.

3) Barred cell: The cell is a cell which broadcasts information on a cell barred through the system information.

4) Reserved cell: The cell is a cell which broadcasts information on a cell reserved through the system information.

Figure 4:
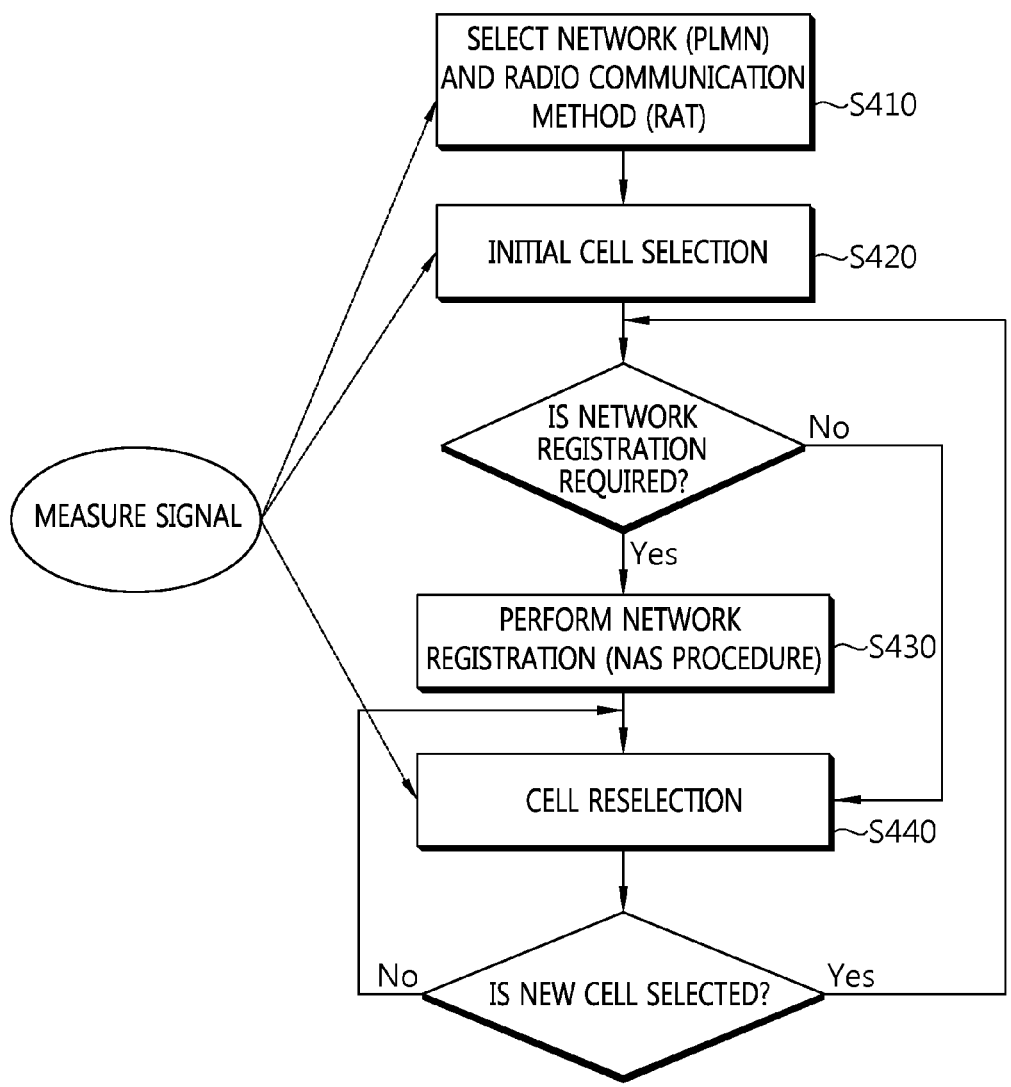
FIG. 4 is a flowchart illustrating an operation of user equipment in an RRC idle state.

FIG. 4 is a flowchart illustrating an operation of the UE in the RRC idle state. FIG. 4 illustrates a procedure of registering a UE in which initial power is turned on in the network through a cell selection process and reselecting the cell if necessary.

Referring to FIG. 4, the UE selects a radio access technology (RAT) for communicating with the PLMN which is a network to receive the service (S410). Information on the PLMN and the RAT may be selected by the user of the UE, and stored in a universal subscriber identity module (USIM) to be used.

The UE selects the measuring BS and a cell having largest value among cells in which signal intensities and quality measured from the BS are larger than a predetermined value (Cell Selection) (S420). This is performing the cell selection by the turned-on UE and may be called initial cell selection. The cell selection procedure will be described below. After the cell selection, the UE receives system information which the BS periodically transmits. The aforementioned predetermined value means a value defined in the system for ensuring the quality for the physical signal in the data transmission/reception. Accordingly, the value may vary according to the applied RAT.

The UE performs a network registering procedure in the case where network registering is required (S430). The UE registers self-information (e.g., IMSI) in order to receive a service (e.g., paging) from the network. The UE needs not to be registered in the connected network whenever selecting the cell, but is registered in the network in the case where information (e.g., tracking area identity (TAD) on the network received from the system information and information on a network which is known to the UE.

The UE performs cell reselection based on a service environment, a UE environment, or the like which is provide by the cell (S440). The UE selects one of other cells providing a better signal characteristic than the cell of the BS to which the UE is connected, when the value of the intensity or the quality of the signal measured from the BS receiving the service is a value measured from the BS of the neighbor cell. This process is distinguished from the initial cell selection of the second process to be called cell re-selection. In this case, in order to prevent the cell from being frequently reselected depending on the change in signal characteristic, there is a temporal constraint. The cell re-selection procedure will be described below.

Figure 5:
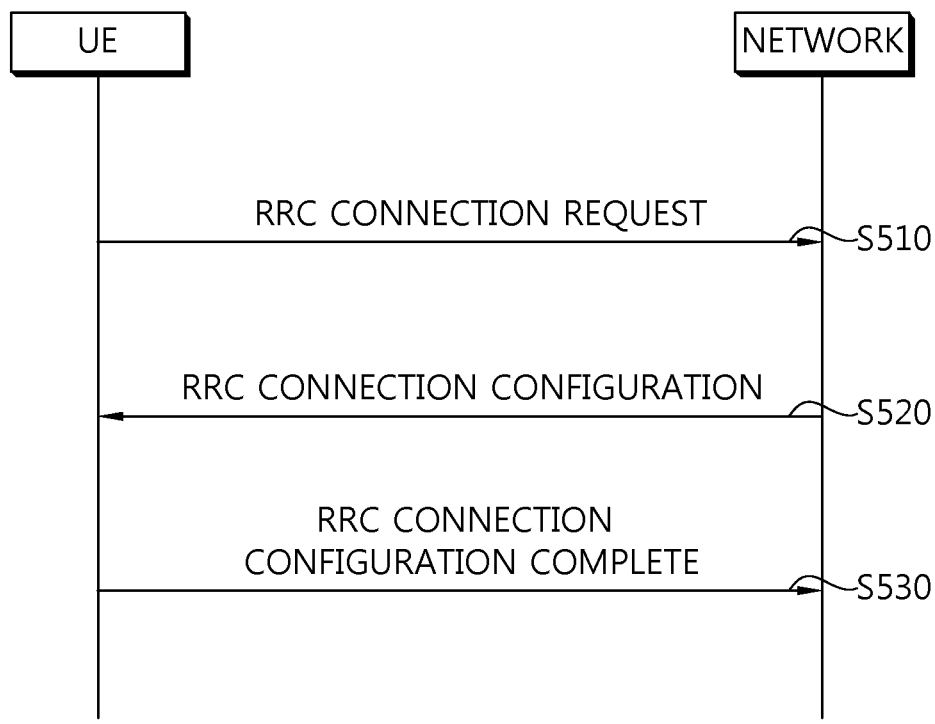
FIG. 5 is a flowchart illustrating a process of establishing RRC connection.

FIG. 5 is a flowchart illustrating a process of establishing RRC connection.

The UE transports an RRC connection request message requesting the RRC connection to the network (S510). The network transports an RRC connection setup message in a response for the RRC connection request (S520). After receiving the RRC connection setup message, the UE enters an RRC connection mode.

The UE transports to the network an RRC connection setup complete message used for verifying successful completion of the RRC connection establishment (S530).

Figure 6:
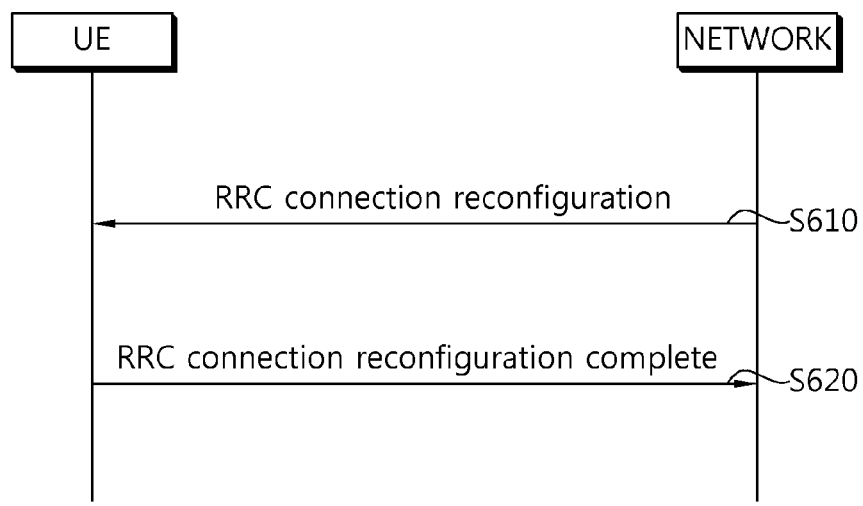
FIG. 6 is a flowchart illustrating a process of reconfiguring the RRC connection.

FIG. 6 is a flowchart illustrating an RRC connection reconfiguration process. The RRC connection reconfiguration is used for modifying the RRC connection. The RRC connection reconfiguration is used for RB establishment/modify/release, handover performance, and measurement setup/modify/release.

The network transports to the UE an RRC connection reconfiguration message for modifying the RRC connection (S610). The UE transports to the network an RRC connection reconfiguration complete message used for verifying successful completion of the RRC connection reconfiguration, as a response to the RRC connection reconfiguration (S620).

Hereinafter, the PLMN will be described.

The PLMN is a network which is arranged and operated by a mobile network operator. Each mobile network operator operates one or more PLMNs. Each PLMN may be identified as a mobile country code (MCC) and a mobile network code (MNC). PLMN information of the cell is include in the system information to be broadcasted.

In PLMN selection, cell selection, and cell re-selection, various types of PLMNs may be considered by the UE.

Home PLMN (HPLMN): PLMN having a MCC and a MNC matched with the MCC and the MNC of the UE IMSI.

Equivalent HPLMN (EHPLMN): PLMN handled to be equivalent to the HPLMN.

Registered PLMN (RPLMN): PLMN in which position registration is successfully completed.

Equivalent PLMN (EPLMN): PLMN handled to be equivalent to the RPLMN.

Each mobile service consumer is subscribed in the HPLMN. When a general service is provided to the UE by the HPLMN or the EHPLMN, the UE is not in a roaming state. On the other hand, when the service is provided to the UE by a PLMN other than the HPLMN/EHPLMN, the UE is in the roaming state, and the PLMN is called a visited PLMN (VPLMN).

The UE searches a usable PLMN and selects a suitable PLMN which may receive the service when the power is turned on in an initial stage. The PLMN is a network which is deployed or operated by a mobile network operator. Each mobile network operator operates one or more PLMNs. Each PLMN may be identified by a mobile country code (MCC) and a mobile network code (MNC). PLMN information of the cell is included in the system information to be broadcasted. The UE attempts to register the selected PLMN. When the registration is completed, the selected PLMN becomes a registered PLMN (RPLMN). The network may signal a PLMN list to the UE, and PLMNs included in the PLMN list may be considered as the PLMN such as the RPLMN. The UE registered in the network needs to be reachable by the network at all times. If the UE is in the ECM-CONNECTED state (equally, the RRC connection state), the network recognizes that the UE receives the service. However, when the UE is in the ECM-IDLE state (equally, the RRC idle state), the situation of the UE is not valid in the eNB, but stored in the MME. In this case, the position of the UE is in the ECM-IDLE state is notified to only the MME with granularity of the list of the tracking areas (TAs). A single TA is identified by a tracking area identity (TAI) constituted by a PLMN identifier to which the TA belongs and a tracking area code (TAC) uniquely expressing the TA in the PLMN.

Next, among the cells provided by the selected PLMN, the UE selects a cell having signal quality and characteristic which may receive a suitable service.

Next, a procedure of selecting the cell by the UE will be described in detail.

When the power is turned on or the UE stays in the cell, the UE performs procedures for receiving the service by selecting/re-selecting a cell having proper quality.

The UE in the RRC idle state selects the cell having the proper quality at all times and needs to be prepared to receive the service through the selected cell. For example, the UE in which the power is just turned on needs to select the cell having the proper quality for registration to the network. When the UE in the RRC connection state enters the RRC idle state, the UE needs to select the cell staying in the RRC idle state. As such, a process of selecting the cell which satisfies any condition so that the UE stays in a service stand-by state such as the RRC idle state is called cell selection. Since the cell selection is performed in a state where the cell in which the UE stays in the RRC idle state is not currently determined, it is more important to select the cell as quickly as possible. Accordingly, so long as the cell is a cell providing radio signal quality of a predetermined level or more, even though the cell is not the cell providing the best signal quality to the UE, the cell may be selected in the cell selection process of the UE.

Hereinafter, with reference to 3GPP TS 36.304 V8.5.0 (2009-03) "User Equipment (UE) procedures in idle mode (Release 8)", a method and a procedure of selecting the cell by the UE in 3GPP LTE will be described in detail.

The cell selection process is largely divided to two processes.

First, as an initial cell selection process, the UE has no previous information on the radio channel in this process. Accordingly, the UE searches all radio channels in order to find a suitable cell. The UE finds the strongest cell in each channel. Thereafter, when the UE just finds the suitable cell stratifying a cell selection reference, the UE selects the corresponding cell.

Next, the UE may select the cell by using the stored information or using information broadcasted in the cell. Accordingly, the cell selection may be quickly performed as compared with the initial cell selection process. The UE selects the corresponding cell when just finding the cell satisfying the cell selection reference. If the UE does not find the suitable cell satisfying the cell selection reference through the process, the UE performs the initial cell selection process.

After the UE selects any cell through the cell selection process, the intensity or the quality of the signal between the UE and the BS may be changed according to mobility of the UE, a change in radio environment, or the like. Accordingly, when the quality of the selected cell deteriorates, the UE may select another cell providing better quality. As such, in the case of selecting the cell again, generally, the UE selects the cell providing better signal quality than the currently selected cell. This process is called cell reselection. The cell reselection process generally has a primary object to select a cell providing the best quality to the UE in terms of the quality of the radio signal.

In addition to the quality of the radio signal, the network determines a priority for each frequency to notify the determined priority to the UE. In the UE receiving the priority, the priority is first considered as compared the radio signal quality reference in the cell reselection process.

As such, there is the method of selecting or reselecting the cell according to a signal characteristic in the radio environment, and in the case of selecting the cell for reselection during the cell reselection, there may be methods of reselecting the cell according to a RAT of the cell and a frequency characteristic below.

Intra-frequency cell reselection: The UE reselects a cell having the same RAT and the same center-frequency as the cell during camping.

Inter-frequency cell reselection: The UE reselects a cell having the same RAT as and a different center-frequency from the cell during camping.

Inter-RAT cell reselection: The UE reselects a cell using a different RAT from the RAT during camping.

A principle of the cell reselection process is as follows.

First, the UE measures the quality of the serving cell and the quality of the neighboring cell for the cell reselection.

Second, the cell reselection is performed based on a cell reselection reference. The cell reselection reference has the following characteristics in association with the measurement of the serving cell and the neighboring cell.

The intra-frequency cell reselection is basically based on ranking. The ranking is an operation of defining index values for evaluating the cell reselection and ranking cells in an order of sizes of the index values by using the index values. A cell having the best index value is commonly called a best ranked cell. The cell index value is based on a value measured by the UE with respect to the corresponding cell and is a value applying a frequency offset or a cell offset if necessary.

The inter-frequency cell reselection is based on a frequency priority provided by the network. The UE attempts to camp on in a frequency having the highest frequency priority. The network may provide a frequency priority to be commonly applied to the UEs in the cell through the broadcast signaling or provide a priority for each frequency for every UE through dedicated signal for each UE. The cell reselection priority provided through the broadcast signaling may be referred to as a common priority, and the cell reselection priority set by the network for each UE may be referred to as a dedicated priority. When the UE receives the dedicated priority, the UE may receive a validity time related with the dedicated priority together. When the UE receives the dedicated priority, the UE starts a validity timer set as the validity time received together. The UE applies the dedicated priority in the RRC idle mode while the validity timer operates. When the validity timer ends, the UE discards the dedicated priority and applies the common priority again.

For the inter-frequency cell reselection, the network may provide parameters (for example, a frequency-specific offset) used in the cell reselection to the UE for each frequency.

For the intra-frequency cell reselection or the inter-frequency cell reselection, the network may provide a neighboring cell list (NCL) used in the cell reselection to the UE. The NCL includes cell-specific parameters (for example, a cell-specific offset) used in the cell reselection.

For the intra-frequency cell reselection or the inter-frequency cell reselection, the network may provide a cell reselection black list used in the cell reselection to the UE. The UE does not perform the cell reselection with respect to the cell included in the black list.

Next, the ranking performed in the cell reselection evaluating process will be described.

A ranking criterion used to give the priority of the cell is defined by Equation 1.

$$R_S = Q_{meas,s} + Q_{hyst}, \quad R_n = Q_{meas,n} - Q_{offset}$$ [Equation 1]

Here, $R_s$ represents a ranking criterion of the serving cell, $R_n$ represents a ranking criterion of the neighboring cell, $Q_{meas,s}$ represents a quality value measured with respect to the serving cell by the UE, $Q_{meas,n}$ represents a quality value measured with respect to the neighboring cell by the UE, $Q_{hyst}$ represents a hysteresis value for ranking, and $Q_{offset}$ represents an offset between the cells.

In the intra-frequency, when the UE receives the offset $Q_{offsets,n}$ between the serving cell and the neighboring cell, $Q_{offset} = Q_{offsets,n}$, and when the UE does not receive $Q_{offsets,n}$, $Q_{offset} = 0$.

In the inter-frequency, when the UE receives the offset $Q_{offsets,n}$ for the corresponding cell, $Q_{offset} = Q_{offsets,n} + Q_{frequency}$, and when the UE does not receive $Q_{offsets,n}$, $Q_{offset} = Q_{frequency}$.

When the ranking criterion $R_s$ of the serving cell and the ranking criterion $R_n$ of the neighboring cell are changed in a similar state, the ranking order is frequently reversed as the changing result, and as a result, the UE may alternately reselect the two cells. $Q_{hyst}$ is a parameter for preventing the UE from alternately reselecting the two cells by giving the hysteresis in the cell reselection.

The UE measures the $R_s$ of the serving cell and the $R_n$ of the neighboring cell according to the Equation 1, regards the cell having the largest ranking criterion value as the best ranked cell, and selects the cell.

According to the reference, it can be seen that the quality of the cell acts as the most important reference in the cell reselection. When the reselected cell is not the suitable cell, the UE excludes the corresponding frequency or the corresponding cell from the cell reselection target.

Hereinafter, radio link monitoring (RLM) will be described.

The UE monitors downlink quality based on a cell-specific reference signal in order to detect the downlink radio link quality of the PCell. The UE estimates the downlink radio link quality for monitoring the downlink radio link quality and compares the estimated quality with threshold values Qout and Qin. The threshold value Qout is defined as a level in which the downlink radio link may not be stably received, and corresponds to a block error rate of 10% of hypothetical PDCCH transmission by considering a PDFICH error. The threshold value Qin is defined a downlink radio link quality level which may be more stably received than the level of the Qout and corresponds to a block error rate of 2% of hypothetical PDCCH transmission by considering a PCFICH error.

Hereinafter, a radio link failure (RLF) will be described.

The UE continuously performs the measurement in order to maintain the quality of the radio link with the serving cell receiving the service. The UE determines whether the communication is impossible in the current situation due to deterioration of the quality of the radio link. When the communication is almost impossible due to the low quality of the serving cell, the UE determines the current situation as a radio link failure.

When the radio link failure is determined, the UE gives up the communication maintenance with the current serving cell, selects a new cell through the cell selection (or cell reselection) procedure, and attempts the RRC connection re-establishment to the new cell.

In a specification of 3GPP LTE, cases where the normal communication is impossible are exemplified below:

a case where the UE determines that there is a serious problem in the downlink communication link quality based on the radio quality measuring result of the PHY layer (determines that the quality of the PCell is low during the RLM.

a case where the UE determines that there is a problem in the uplink transmission when a random access procedure is continuously failed in a MAC sub-layer.

a case where the UE determines that there is a problem in the uplink transmission when uplink data transmission is continuously failed in an RLC sub-layer.

a case where the UE determines that the handover is failed.

a case where a massage received by the UE does not pass through an integrity check.

Hereinafter, the RRC connection re-establishment procedure will be described in more detail.

Figure 7:
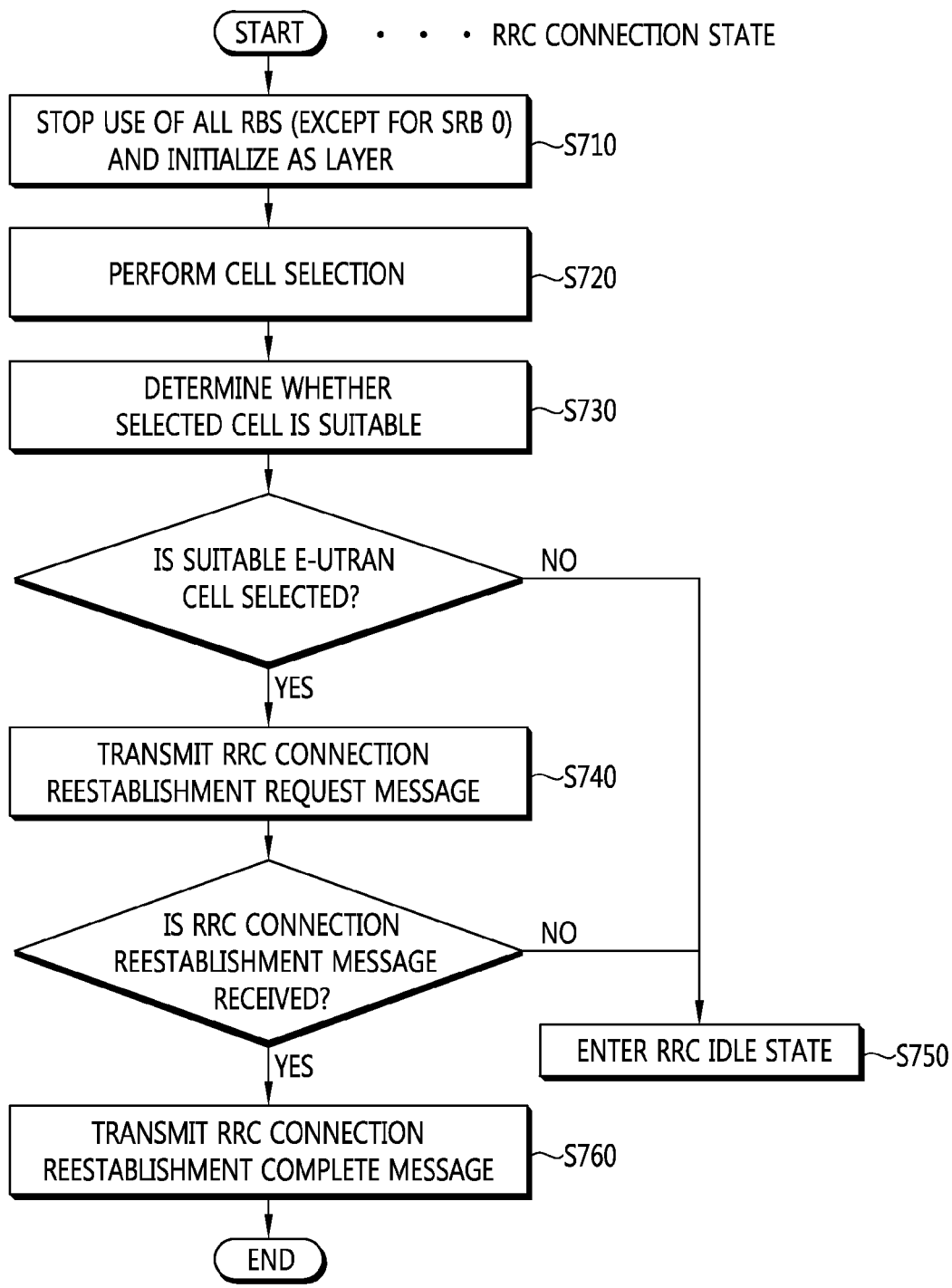
FIG. 7 is a diagram illustrating a procedure of reestablishing the RRC connection.

FIG. 7 is a diagram illustrating a RRC connection re-establishment procedure.

Referring to FIG. 7, the UE stops the used of all radio bearers which have been set except for signaling radio bearer #0 (SRB 0) and initializes each sub-layer of the AS (S710). Further, each sub-layer and the PHY layer are set as a default configuration. The UE maintains the RRC connection state during such a process.

The UE performs a cell selection procedure for performing the RRC connection reconfiguration procedure (S720). The cell selection procedure in the RRC connection reconfiguration procedure may be performed the same as the cell selection procedure performed in the RRC idle state of the UE even though the UE maintains the RRC connection state.

The UE verifies the system information of the corresponding cell to determine whether the corresponding cell is a suitable cell or not, after performing the cell selection procedure (S730). When it is determined that the selected cell is the suitable E-UTRAN cell, the UE transmits an RRC connection reestablishment request message to the corresponding cell (S740).

Meanwhile, when it is determined that the cell selected through the cell selection procedure for performing the RRC connection reestablishment procedure is the cell using the RAT other than the E-UTRAN, the UE stops the RRC connection reestablishment procedure and enters the RRC idle state (S750).

The UE may be implemented so that the cell selection procedure and the suitability verification of the cell by receiving the system information of the selected cell are finished within a limited time. To this end, the UE may drive a timer according to the starting of the RRC connection reestablishment procedure. The timer may stop when it is determined that the UE selects the suitable cell. When the timer ends, the UE may regard that the RRC connection reestablishment procedure is failed and enter the RRC idle state. The timer is hereinafter referred to as a radio link failure timer. In LTE specification TS 36.331, a timer called T311 may be used as the radio link failure timer. The UE may acquire the setting value of the timer from the system information of the serving cell.

In the case of receiving and accepting the RRC connection reestablishment request message from the UE, the cell transmits a RRC connection reestablishment message to the UE.

The UE receiving the RRC connection reestablishment message from the cell reconfigures the PDCP sub-layer and the RLC sub-layer for the SRB1. Further, the UE calculates various key values related with security setting and reconfigures the PDCP sub-layer responsible for the security with newly calculated security key values. As a result, the SRB 1 between the UE and the cell is opened, and the RRC control message may be transmitted and received. The UE completes the restarting of the SRB1, and transmits to the cell an RRC connection reestablishment complete message that the RRC connection reestablishment procedure is completed (S760).

On the contrary, in the case of receiving and rejecting the RRC connection reestablishment request message from the UE, the cell transmits a RRC connection reestablishment reject message to the UE.

When the RRC connection reestablishment procedure is successfully performed, the cell and the UE perform the RRC connection reestablishment procedure. As a result, the UE restores a state before performing the RRC connection reestablishment procedure and maximally secures continuity of the service.

Next, a report of the RLF will be described.

When the RLF is generated or a handover failure is generated, the UE reports such a failure event to the network in order to support mobility robustness optimisation (MRO) of the network.

After the RRC connection reestablishment, the UE may provide the RLF report to the eNB. The radio measurement included in the RLF report may be used as a potential cause of the failure in order to identify coverage problems. This information may be used for excluding the events in the MRO evaluation for the intra-LTE mobility connection failure and transmitting the events as inputs for other algorithms.

When the RRC connection reestablishment is failed or the UE does not perform the RRC connection reestablishment, the UE is reconnected in the idle mode to generate the valid RLF report for the eNB. For the purpose, the UE stores information on the latest RLF or the handover failure, and may indicate to the LTE cell that the RLF report is valid every subsequent RRC connection (re)establishment and handover, until the RLF report is asked by the network or for 48 hours after the RLF or the handover failure is detected.

The UE maintains the information for the state transition and the RAT change, and returns to the LTE RAT and then indicates the RLF report is valid again.

The validity of the RLF report in the RRC connection configuration procedure indicates that the UE receives disturbance such as connection failure and the RLF report is not transmitted to the network due to the failure. The RLF report from the UE includes the following information.

E-CGI of a last cell (in the case of RLF) which provided the service to the UE or a handover target When the E-CGI is not known, PCI and frequency information are used instead.

E-CGI of the cell which attempted to reestablishment.

E-CGI to the cell which provided the service to the UE, when the last handover is initialized, for example, message 7 (RRC connection reconfiguration) is received by the UE.

Time from the last handover initialization to the connection failure information indicating whether the connection failure is due to the RLF or the handover failure radio measurements position of the failure The eNB receiving the RLF failure from the UE may forward the report to the eNB which has provided the service to the UE before the reported connection failure. The radio measurements included in the RLF report may be used for identifying coverage issues as a potential cause of the radio link failure. This information may be used for excluding the events from the MRO evaluation of the intra-LTE mobility connection failure and transmitting the events as the input of other algorithms.

Hereinafter, a measurement and a measurement report will be described.

In a mobile communication system, supporting mobility of UE is required.

Accordingly, the UE continuously measures a quality for a serving cell that provides a current service and a quality for a neighbor cell. The UE reports a measurement result to a network at an appropriate time and a network provides optimal mobility to the UE through a handover, and the like. Commonly, the measurement for the purpose is called a radio resource management (RRM) measurement.

The UE may perform a measurement for a specific purpose set by the network and reports a measurement result thereof to the network, in order to provide information to help a provider to operate the network in addition to the purpose of supporting the mobility. For example, the UE receives broadcast information of a specific cell determined by the network. The UE may report to the serving cell a cell identity (also referred to as a global cell identity) of the specific cell, position identification information (for example, tracking area code) to which the specific cell belongs, and/or other cell information (for example, whether a closed subscriber group (CSG) cell is member).

When the UE which is moving verifies that a quality in a specific region is very bad through the measurement, positional information and a measurement result regarding cells of which the qualities are bad may be reported to the network. The network may attempt optimization of the network based on the report of the measurement result of the UEs that help operating the network.

In a mobile communication system in which a frequency reuse factor is 1, mobility is most achieved among different cells which are in the same frequency band. Accordingly, in order to well guarantee the mobility of the UE, the UE needs to well measure qualities and cell information of neighbor cells having center frequencies which is the same as a center frequency of the serving cell. A measurement for the cell having the center frequency which is the same as the center frequency of the serving cell as described above is called an intra-frequency measurement. The UE reports the measurement result to the network at an appropriate time by performing the intra-frequency measurement to achieve the purpose of the corresponding measurement result.

A mobile communication provider may operate the network by using a plurality of frequency bands. When a service of the communication system is provided through the plurality of frequency bands, the UE may need to well measure qualities and cell information of neighbor cells having center frequencies which are different from the center frequency of the serving cell, in order to guarantee optimal mobility for the UE. As described above, a measurement for the cell having the center frequency which is different from the center frequency of the serving cell is called an inter-frequency measurement. The UE may need to report the measurement result to the network at an appropriate time by performing the inter-frequency measurement.

When the UE supports a measurement for the network based on an RAT, the UE may perform a measurement for a cell of the corresponding network by a configuration by the base station. The measurement is called an inter-RAT measurement. For example, RAT may include a UMTS terrestrial radio access network (UTRAN) and a GSM EDGE radio access network (GERAN) that follow a 3GPP standard specification and may also include a CDMA 2000 system that follows a 3GPP2 standard specification.

Figure 8:
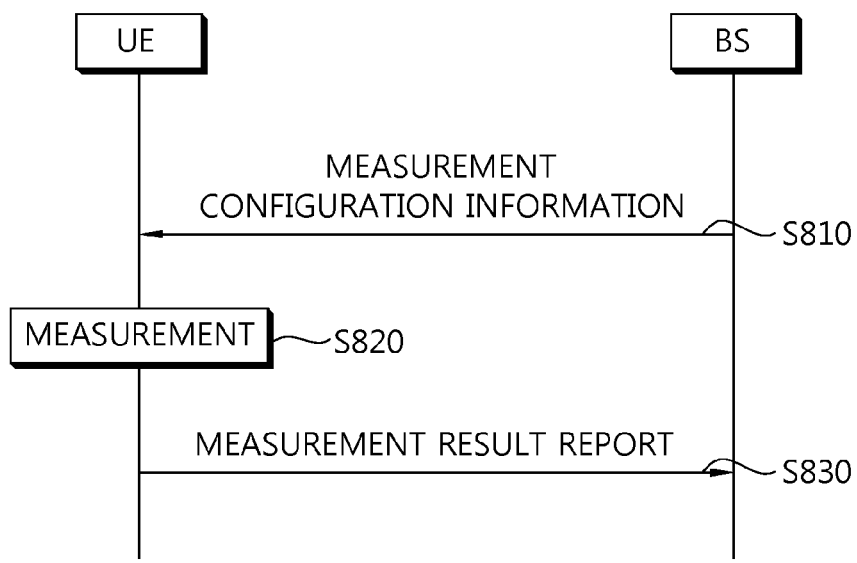
FIG. 8 is a flowchart illustrating a method for performing measurement in the related art.

FIG. 8 is a flowchart illustrating a method for performing measurement in the related art.

The UE receives measurement configuration information from the base station (S810). A message including the measurement configuration information is called a measurement configuration message. The UE performs the measurement based on the measurement configuration information (S820). The UE reports the measurement result to the base station when the measurement result satisfies a reporting condition in the measurement configuration information (S830). A message including the measurement result is called a measurement reporting message.

The measurement configuration information may include the following information.

(1) Measurement object information: The measurement object information is information on an object for which the UE is to perform a measurement. A measurement object may include at least one of an intra-frequency measurement object which is an object of an intra-cell measurement, an inter-frequency measurement object which is an object of an inter-cell measurement, and an inter-RAT measurement object which is an object of an inter-RAT measurement. For example, the intra-frequency measurement object may indicate the neighbor cell having the same frequency band as the serving cell, the inter-frequency measurement object may indicate the neighbor cell having the different frequency band from the serving cell, and the inter-RAT measurement object may indicate a neighbor cell of RAT different from the RAT of the serving cell.

(2) Reporting configuration information: The reporting configuration information is information on a reporting condition and a reporting type regarding the time when the UE reports the measurement result. The reporting condition may include information on an event or a cycle in which reporting the measurement result is triggered. The reporting type is information regarding a configuration type of the measurement result.

(3) Measurement identity information: The measurement identity information is information regarding a measurement identity that determines a measurement object, a reporting time, and a reporting type by the UE by associating the measurement target and the reporting configuration with each other. The measurement identity information is included in the measurement reporting message to represent a measurement object of the measurement result and a reporting condition of the measurement reporting which occurs.

(4) Quantity configuration information: The quantity configuration information is information on a parameter for configuring filtering of a measurement unit, a reporting unit, and/or a measurement result value.

(5) Measurement gap information: The measurement gap information is information on a measurement gap which is an interval which the UE may use for only measurement without considering data transportation with the serving cell because downlink transportation or uplink transportation is not scheduled.

The UE has a measurement object list, a measurement reporting configuration list, and a measurement identity list in order to perform a measurement procedure.

In the 3GPP LTE, the base station may configure only one measurement object for one frequency band to the UE. According to Clause 5.5.4 of 3GPP TS 36.331 V8.5.0 (2009-03) "Evolved Universal Terrestrial Radio Access (E-UTRA) Radio Resource Control (RRC); Protocol specification (Release 8)", events that trigger the measurement reporting shown in the following table are defined.

TABLE 1

| Events | Reporting conditions |
| --- | --- |
| Event A1 | Serving becomes better than threshold |
| Event A2 | Serving becomes worse than threshold |
| Event A3 | Neighbour becomes offset better than serving |
| Event A4 | Neighbour becomes better than threshold |
| Event A5 | Serving becomes worse than threshold1 and neighbour becomes better than threshold2 |
| Event B1 | Inter RAT neighbour becomes better than threshold |
| Event B2 | Serving becomes worse than threshold1 and inter RAT neighbour becomes better than threshold2 |

When the measurement result of the UE satisfies the configured event, the UE transports the measurement reporting message to the base station.

Figure 9:
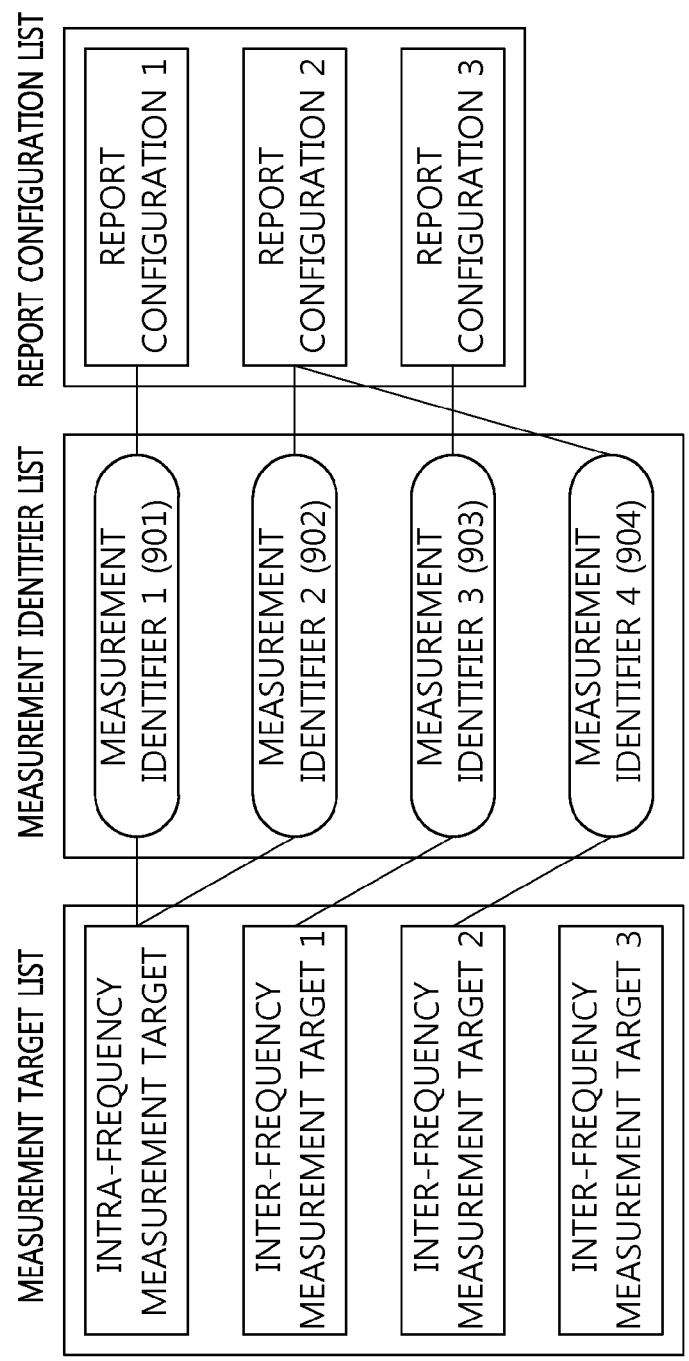
FIG. 9 illustrates an example of a measurement configuration which is configured to user equipment.

FIG. 9 illustrates an example of a measurement configuration which is configured to user equipment.

First, measurement identity 1 901 connects the intra-frequency measurement object and reporting configuration 1. The UE performs intra frequency measurement and the reporting configuration 1 is used to determine a reference and a reporting type of reporting the measurement result.

Measurement identity 2 902 is connected with the intra-frequency measurement object similarly to the measurement identity 1 901, but the intra-frequency measurement object is reporting configuration 2. The UE performs measurement and the reporting configuration 2 is used to determine the reference and the reporting type of reporting the measurement result.

By the measurement identity 1 901 and the measurement identity 2 902, the UE transports the measurement result even though the measurement result for the intra-frequency measurement object satisfies any one of the reporting configuration 1 and the reporting configuration 2.

Measurement identity 3 903 connects inter-frequency measurement object 1 and reporting configuration 3. When a measurement result for the inter-frequency measurement object 1 satisfies a reporting condition included in the reporting configuration 1, the UE reports the measurement result.

Measurement identity 4 904 connects the inter-frequency measurement object 2 and the reporting configuration 2. When a measurement result for the inter-frequency measurement object 2 satisfies a reporting condition included in the reporting configuration 2, the UE reports the measurement result.

Meanwhile, the measurement object, the reporting configuration, and/or the measurement identity may be added, changed, and/or deleted. These may be instructed when the base station sends a new measurement configuration message or a measurement configuration change message to the UE.

Figure 10:
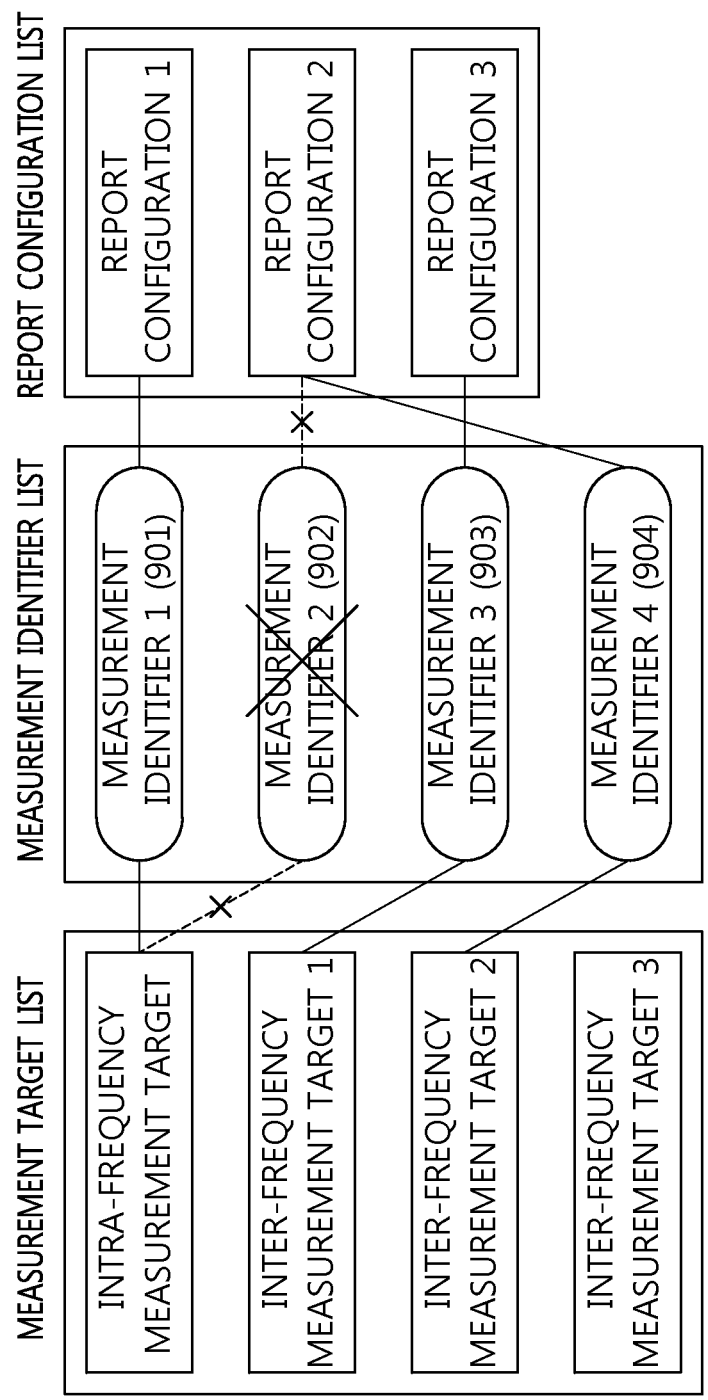
FIG. 10 illustrates an example of deleting a measurement identifier.

FIG. 10 illustrates an example of a structure of the inverted index. When the measurement identity 2 902 is deleted, measurement for a measurement object associated with the measurement femto identity 2 902 is stopped and a measurement report is not transported. A measurement object or a reporting configuration associated with the deleted measurement identity may not be changed.

Figure 11:
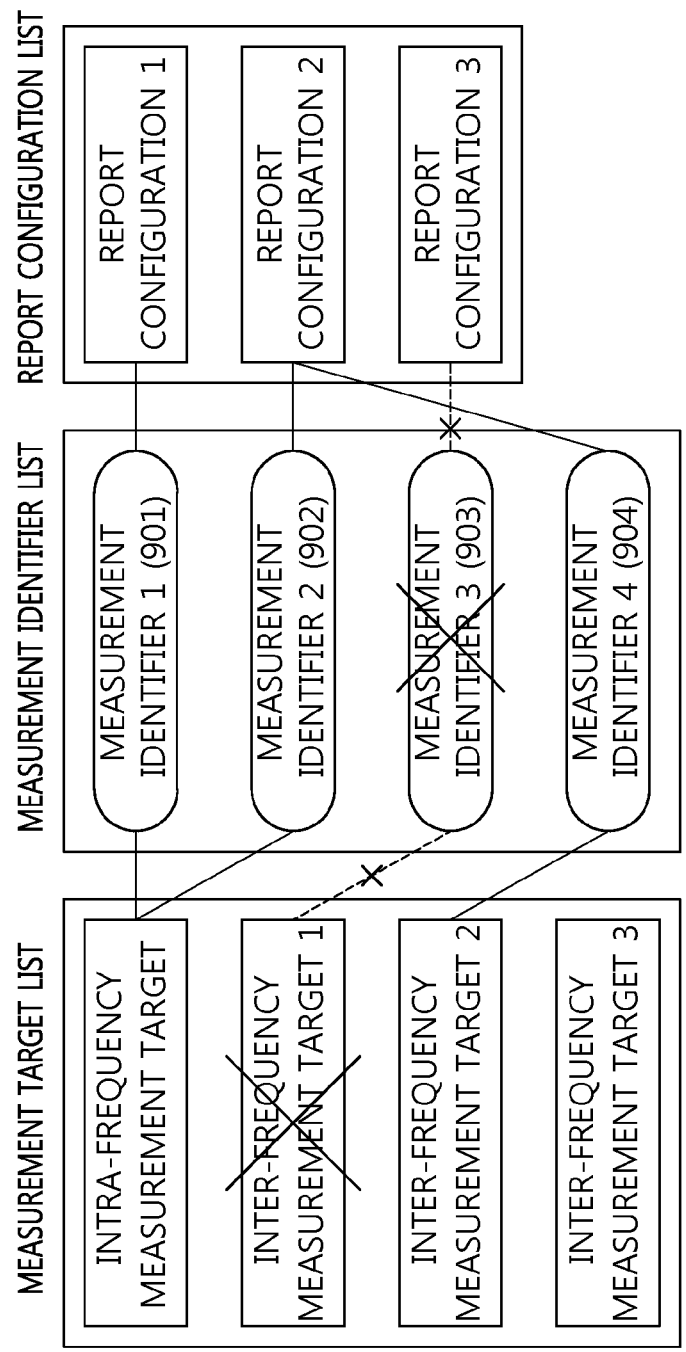
FIG. 11 illustrates an example of deleting a measurement object.

FIG. 11 illustrates an example of deleting the measurement object. When the inter-frequency measurement object 1 is deleted, the UE deletes even the measurement identity 3 903 associated therewith. Measurement for the inter-frequency measurement object 1 is stopped and a measurement report is not also transported. However, a reporting configuration associated with the deleted inter-frequency measurement object may not be changed or deleted.

When the reporting configuration is removed, the UE removes even a measurement identity associated therewith. The UE stops measurement for an associated measurement object by the associated measurement identity. However, the measurement object associated with the deleted reporting configuration may not be changed or deleted.

The measurement report may include the measurement identity, a measured quality of the serving cell, and a measurement result of the neighboring cell. The measurement identity identifies a measurement object in which the measurement report is triggered. The measurement result of the neighboring cell may include a cell identity and a measurement quality of the neighboring cell. The measured quality may include at least one of reference signal received power (RSRP) and reference signal received quality (RSRQ).

When the UE performs the measurement according to the measurement configuration, there may be an additionally considered condition and as one example thereof, there may be S-measurement. The UE verifies whether a measurement condition depending on the S-measurement is satisfied in measuring a measurement object instructed by the measurement configuration. The S-measurement may be configured as an S-measurement threshold is included in the measurement configuration to be given to the UE and the UE may compare the S-measurement threshold and a quality (i.e., RSRP) of a primary serving cell PCell. The UE may omit intra-frequency/inter-frequency/inter-RAT measurement configured by the measurement configuration when the quality of the primary serving cell is higher than the S-measurement threshold.

A micro cell, a femto cell, a pico cell, and the like which have small service areas may be installed at a predetermined position of a macro cell having wide coverage. As such, a network in which the macro cell and the small cells coexist may be called a heterogeneous network. Traffic that may be concentrated in the macro cell may be offloaded to the small cells through the small cells installed in the coverage of the macro cell. This may reduce the load for the macro cell and increase capacity of the network.

In a hetero network, the UE needs to sense a small cell which is being operated on an inter-frequency and perform measurement for the corresponding cell so as to move to the small cell. This may be called a cell discovery procedure including sensing the small cell and measuring the corresponding cell.

Meanwhile, inter-frequency measurement for the small cell requests the UE to adopt a measurement gap and using the measurement gap may cause service interruption on a serving frequency, which may degrade a service quality. Therefore, a cell discovery related operation method is required so as to measure the neighboring cell on the inter-frequency without the service interruption or the degradation of the service quality.

For efficient operation related with the cell discovery procedure as described above, in the present invention, the network provides fingerprint information and the UE proposes a method for operating an operation related with the cell discovery procedure based on the fingerprint information. Herein, the fingerprint information may be information provided by the network that instructs a region in which the small cell which is being operated on the inter-frequency.

Figure 12:
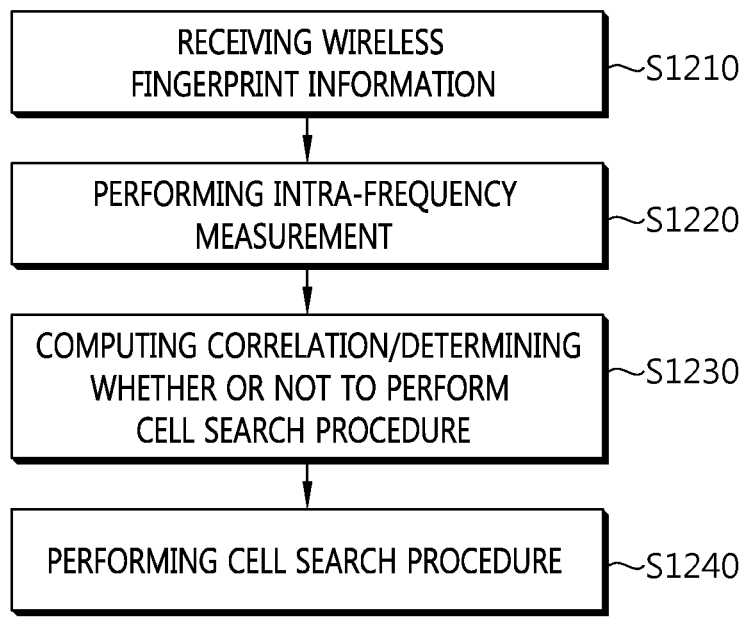
FIG. 12 is a diagram illustrating an operation method according to an exemplary embodiment of the present invention.

FIG. 12 is a diagram illustrating an operation method according to an exemplary embodiment of the present invention.

Referring to FIG. 12, the UE receives wireless fingerprint information from the network (S1210).

The wireless fingerprint information may include the cell identity list. A cell identity included in the cell identity list may indicate a small cell on the intra-frequency, which is expected to be sensed. The cell identity may be explicitly included in the wireless fingerprint information. The wireless fingerprint information may be not explicitly indicated in the wireless fingerprint information and in this case, may be implicitly embedded in the wireless fingerprint information.

The wireless fingerprint information may include a detection threshold. The detection threshold may be implemented as a list of thresholds. The respective thresholds in the list may be related with respective cells indicated by the cell identity list. Alternatively, the detection threshold may be implemented as a single threshold. In this case, one threshold may be applied to all cells.

The wireless fingerprint information may include a correlation threshold. The correlation threshold may be a value which becomes a reference for correlation evaluation used for the UE to determine whether to perform the cell discovery procedure according to a calculated correlation.

The wireless finger print information may further include one or more target frequencies. The target frequency represents the inter-frequency of the cell, which may be sensed through the cell discovery procedure by the UE. The target frequency for a cell discovery may be explicitly included in the wireless fingerprint information. The target frequency for the cell discovery may be not explicitly indicated in the wireless fingerprint information and in this case, may be implicitly embedded in the wireless fingerprint information.

A detailed method in which the wireless fingerprint information is configured in the UE may be described below.

1) The wireless finger print information may be configured for each UE. The wireless finger print information which may be commonly applied to a plurality of frequencies is transported to the UE by the network to be configured. When the UE is in an RRC_CONNECTED state, the UE may consider the wireless fingerprint information configured only for a frequency in which the measurement object is configured. When the UE is in an RRC_IDLE state, the UE may consider the wireless fingerprint information configured only for a frequency in which a cell reselection priority is configured.

2) The wireless finger print information may be configured for each frequency. That is, the wireless fingerprint information which may be applied only to a specific frequency may be provided to the UE. In this case, when the UE receives the wireless fingerprint information from a macro cell which is being operated at a specific frequency and thereafter, moves to a small cell which is being operated at another frequency, the UE needs to newly receive the fingerprint information which may be applied at the frequency of the small cell. Further, a specific small cell may provide fingerprint information which may be applied at a frequency other than a frequency operated thereby.

3) The wireless finger print information may be configured for each cell. When the neighboring cell may be sensed through the cell discovery procedure, individual fingerprint information may be provided for each neighboring cell. When the fingerprint information is configured for each cell, the network may provide a frequency of a target which may be discovered through the cell discovery procedure.

The UE acquires measurement results of wireless measurements (S1220). The measurement results acquired by the UE may be results depending on an inter-frequency measurement indicated by a measurement object of a measurement configuration.

The UE calculates a correlation and determines whether to perform the cell discovery procedure based on the correlation (S1230). When a wireless measurement result is available, the UE may calculate correlations between the measurement results and the fingerprint information. The correlations may be defined as a measure of commonality between the measurement results of the wireless measurement results and a radio profile which may be respectively specified by the wireless fingerprint information. When the UE determines that the correlation is high, the UE may determine to perform the cell discovery procedure for the inter-frequency.

In more detail, when the number of cells included in the measurement results of the intra-frequency is multiple, a correlation evaluating method for determining whether to perform the cell discover procedure may be implemented as described below.

(1) Correlation evaluating method 1: The UE may calculate a value acquired by weighted summation of the number of cells that satisfy a specific condition as a correlation value. In this case, the UE may perform weighted summation of the number of cells that three conditions including 1) a cell (a cell indicated by the cell identity included in the wireless fingerprint information) included in the wireless fingerprint information, 2) a cell included in a measurement result of a wireless measurement, and 3) a cell in which a measurement result of the corresponding cell is larger than a detection threshold indicated by a wireless fingerprint. The weighted summation of the number of cells may be implemented as shown in an equation given below.

$$\sum_{k=1}^{N} F_k W_k \quad \text{[Equation 2]}$$

(Where, the N represents the total number of cells, and $F_k$ is set to 1 if a k-th cell satisfies the condition and to 0 if not and the $W_k$ represents a weighted summation of the k-th cell.)

When the weighted summed value is larger than the correlation threshold indicated in the wireless fingerprint value, the UE considers that the correlation is high to determine to perform the cell discovery procedure. A weighted factor used for the weighted summation may be defined for each cell and a value thereof may be a real number.

Correlation evaluating method 2: The UE weighted-sums a difference value related with a measurement quality of a related cell to be used as a correlation value. That is, the UE may configure a result acquired by weighted-summing difference values between quality measurement values for the respective cells indicated by the wireless fingerprint information and a specific reference value as the correlation value. The reference value may be a measurement result value expected when the corresponding cell is measured. The reference value may be individually configured for the cell indicated by the cell list included in the fingerprint. In some cases, the reference value may be configured similarly to a detection threshold included in the wireless fingerprint. The reference value may be a specific value configured by the network or previously configured in the UE. The weighted factor used for the weighted summation may be defined for each cell and the value thereof may be the real number. As a quality measurement value, an RSRP or RSRQ value may be used. When the calculated correlation value is larger than the correlation threshold indicated in the wireless fingerprint information, the UE considers that the correlation is high to determine to perform the cell discovery procedure.

Meanwhile, the UE may not acquire an available quality measurement value for the cell indicated by the wireless fingerprint information. In this case, the UE may calculate the correlation value by using the quality measurement value of the corresponding cell as a default value in order to calculate the correlation value. The default value may be previously configured in the UE or provided with being included in the wireless fingerprint information.

Correlation evaluating method 3: 1) The measurement result of the wireless measurement includes measurement results for all cells indicated by the wireless fingerprint information and 2) when the measurement result of the wireless measurement is more than the detection threshold value, the UE considers that the correlation is high to determine to perform the cell discovery.

Correlation evaluating method 4: 1) The measurement result of the wireless measurement includes a measurement result for at least one cell indicated by the wireless fingerprint information and 2) when the measurement result of the cell indicated by the wireless fingerprint information is more than the detection threshold value, the UE considers that the correlation is high to determine to perform the cell discovery.

When the UE receives the wireless fingerprint information which may be commonly applied to the plurality of frequencies, the UE may use both a result of the intra-frequency wireless measurements and a result of wireless measurements based on the intra-frequency wireless fingerprint information in order to calculate the correlation value. In this case, the correlation may be considered to be available for the plurality of corresponding frequencies.

When the UE receives the wireless fingerprint information which may be commonly applied to a specific frequency, the UE may use both the result of the intra-frequency wireless measurements and the result of the wireless measurements based on the intra-frequency wireless fingerprint information in order to calculate the correlation value. In this case, the correlation may be considered to be available for the corresponding frequency.

When the UE determines to perform the cell discovery procedure, the UE performs the cell discovery procedure (S1240).

The UE may perform an operation such as inter-frequency measurement and reporting depending on the inter-frequency measurement configuration in the RRC_CONNECTED state as the cell discovery procedure.

The UE may perform the operation such as the inter-frequency measurement and reporting depending on the inter-frequency measurement configuration in the RRC_IDLE state as the cell discovery procedure.

The UE may perform an operation such as triggering an autonomous cell search function for a specific inter-frequency or a plurality of inter-frequencies in the RRC_CONNECTED state or the RRC_IDLE state as the cell discovery procedure.

Figure 13:
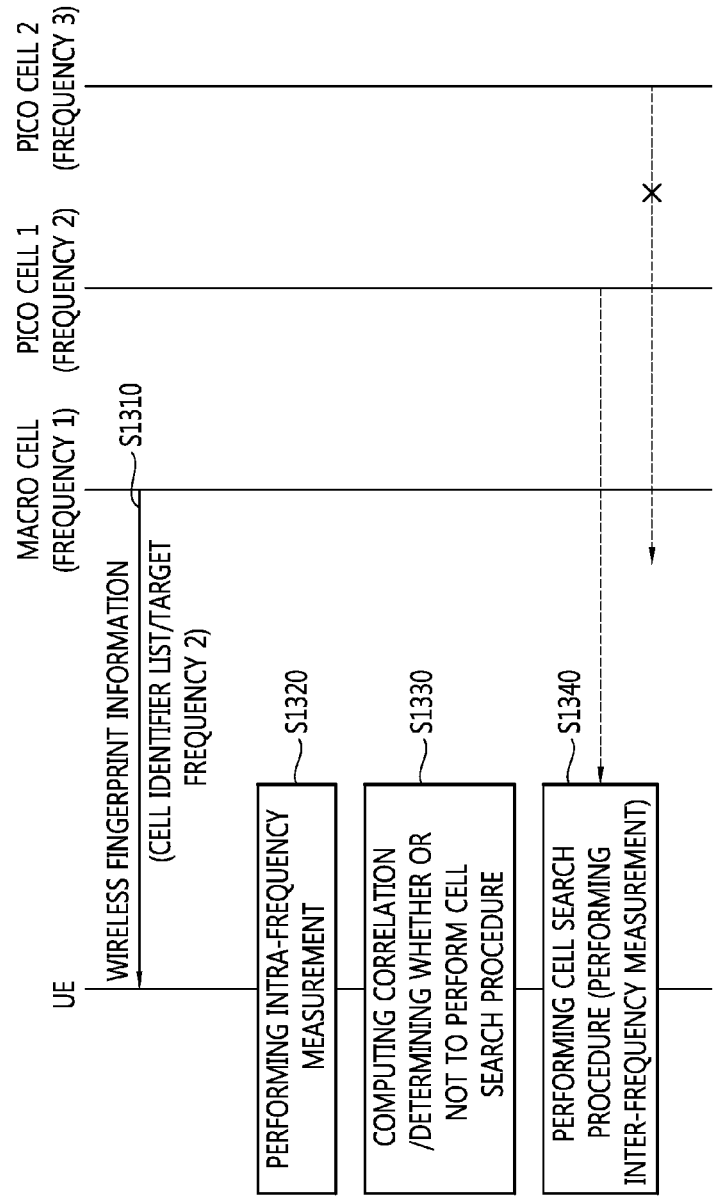
FIG. 13 is a diagram illustrating an example of an operation method for a cell searching procedure according to the exemplary embodiment of the present invention.

FIG. 13 is a diagram illustrating an example of an operation method for a cell searching procedure according to the exemplary embodiment of the present invention.

In FIG. 13, it is assumed that the UE operates by using the macro cell which is operated at frequency 1 as the serving cell. It is assumed that pico cell 1 and pico cell 2 are present in coverage of the macro cell, and the pico cell 1 is being operated at frequency 2 and pico cell 3 is being operated at frequency 3.

Referring to FIG. 13, the macro cell transports the wireless fingerprint information to the UE (S1310). The wireless fingerprint information may be broadcasted by the macro cell or unicast-transported to the UE. The wireless fingerprint information may represent a radio profile regarding a region in which the small cell (e.g., pico cell) may be sensed at the inter-frequency. A detailed example of the wireless fingerprint information may be implementation of the wireless fingerprint information described with reference to FIG. 11. In the example, it is assumed that the wireless fingerprint information includes a cell list, an RSRP value as a detection threshold for each cell in the cell list, and a target frequency for the cell discovery.

The UE performs the intra-frequency measurement (S1320).

When measurement results of the intra-frequency wireless measurement are available, the UE calculate correlations between the measurement results and the wireless fingerprint information and determines to perform the cell discovery procedure (S1330). In the example, the UE may determine the cell discovery procedure based on the method proposed in the correlation evaluating method 3 described in FIG. 12 in order to determine whether to perform the cell discovery procedure. In this case, the UE may determine whether the measured results include measurement results for all cells indicated by the cell list in the wireless fingerprint information and the measurement results of the cells indicated by the cell list are more than the respective detection threshold values. When the condition is satisfied, the UE may determine to perform the cell discovery procedure.

When the UE determines to perform the cell discovery procedure, the UE may start the cell discovery procedure (S1340). The UE may discover cells at target frequencies included in the wireless fingerprint information. Since the target frequency included in the wireless fingerprint information indicates the frequency 2, the UE may perform cell-discovery for the pico cell 1 which is being operated at the frequency 2. In this case, the UE may acquire a measurement result for the pico cell 1. On the contrary, the UE may not perform cell discovery for the pico cell 2 which is being operated at the frequency 3.

The cell discovery procedure described with reference to FIGS. 12 and 13 may be implemented in combination with the S-measurement operation of the UE. As described above, the S-measurement is used to determine whether to perform the intra-frequency/inter-frequency/inter-RAT measurement depending on the measurement configuration based on the measurement quality of the primary serving cell and the S-measurement threshold. Accordingly, when the S-measurement related operation is added to the operation method according to the exemplary embodiment of the present invention, higher efficiency may be acquired in terms of energy.

When the S-measurement is configured, but the wireless fingerprint information is not configured, the UE may acquire the measurement result for the serving cell and when the quality of the serving cell is higher than the S-measurement threshold, the UE may omit the inter-frequency measurement and the intra-frequency measurement for the neighboring cell.

Unlike this, while both the S-measurement and the wireless fingerprint information are configured, the UE may perform the intra-frequency measurement even when the quality of the serving cell is higher than the S-measurement threshold. According to the existing S-measurement, the reason is that even the intra-frequency measurement for the neighboring cell by the UE may be omitted, but when the intra-frequency measurement is omitted, the operation of the UE based on the wireless fingerprint information may be contradictory.

Further, when the UE determines to perform the cell discovery procedure according to correlation evaluation while the quality of the serving cell is higher than the S-measurement threshold, the UE may omit measurement for inter-frequencies other than the target frequency in the wireless fingerprint information and perform inter-frequency measurement for the target frequency in the wireless fingerprint information. On the contrary, when the UE determines not to perform the cell discovery procedure according to the correlation evaluation, the UE may omit measurement for the inter-frequencies including the target frequency.

Figure 14:
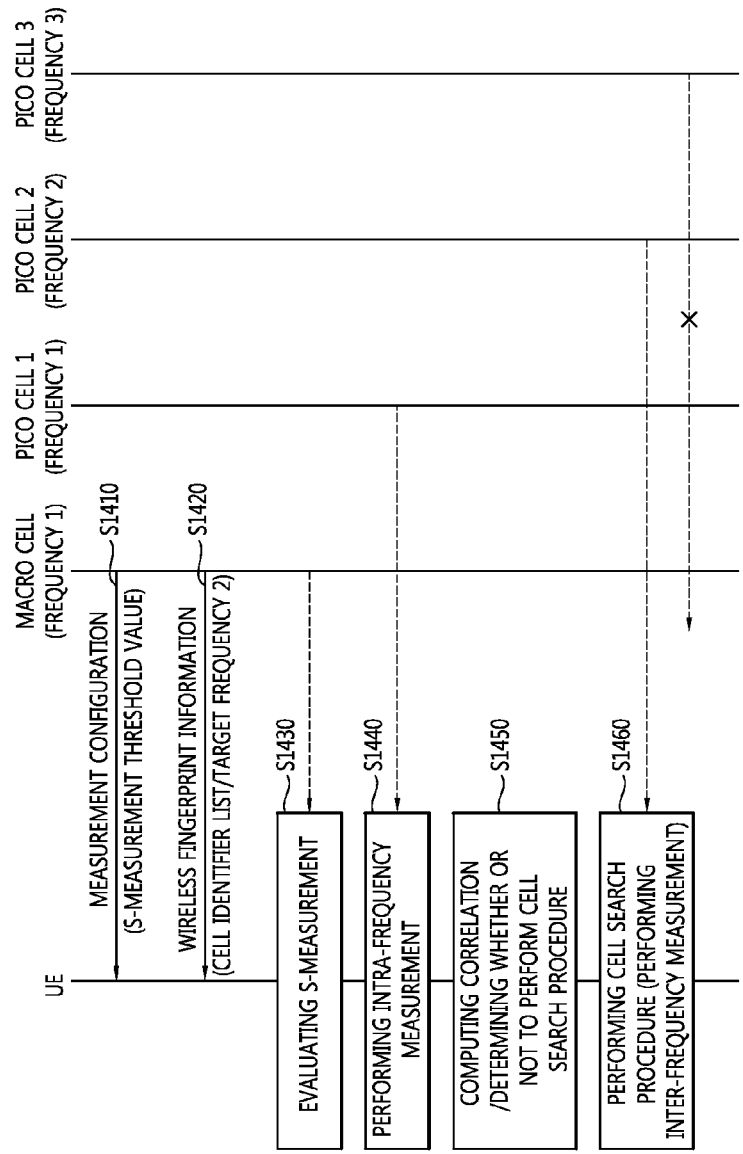
FIG. 14 is a diagram illustrating an example of the operation method according to the exemplary embodiment of the present invention.

FIG. 14 is a diagram illustrating an example of the operation method according to the exemplary embodiment of the present invention.

In the example of FIG. 14, it is assumed that the UE operates by using the macro cell which is operated at the frequency 1 as the serving cell. It is assumed that the pico cell 1 at the frequency 1, the pico 2 at the frequency 2, and the pico cell 3 at the frequency 3 are present in the coverage of the macro cell.

The UE receives the measurement configuration from the macro cell (S1410). The measurement configuration includes the S-measurement threshold for the S-measurement related operation.

The macro cell transports the wireless fingerprint information to the UE (S1420). A detailed example of the wireless fingerprint information may be implementation of the wireless fingerprint information described with reference to FIG. 11. In the example, it is assumed that the wireless fingerprint information includes a cell list, an RSRP value as a detection threshold for each cell in the cell list, and a target frequency for the cell discovery.

The UE performs S-measurement evaluation based on the S-measurement threshold (S1430). The UE performs the intra-frequency measurement for the macro cell which is the serving cell and verifies whether the measured quality value is higher than the S-measurement threshold. In the example, it is assumed that the measurement quality of the macro cell is higher than the S-measurement threshold.

The UE performs the intra-frequency measurement (S1440). Since both the S-measurement configuration and the fingerprint information are configured, the UE may perform the intra-frequency measurement for the neighboring cell regardless of a result of the S-measurement evaluation.

When measurement results of the intra-frequency wireless measurement are available, the UE calculate correlations between the measurement results and the wireless fingerprint information and determines to perform the cell discovery procedure (S1450). The correlation evaluation may be implemented according to various examples described with reference to FIG. 12.

When the UE determines to perform the cell discovery procedure, the UE may start the cell discovery procedure (S1460). The inter-frequency measurement may be omitted according to the S-measurement evaluation, but the UE determines to perform the cell discovery through the correlation evaluation, and as a result, the UE may perform the inter-frequency measurement for the pico cell 2 which is being operated at the frequency 2 as the target frequency. On the contrary, the inter-frequency measurement for the frequency 3 may be omitted.

Unlike the illustrated example, when the UE determines not to perform the cell discovery according to the correlation evaluation, the UE may not perform the inter-frequency measurement for both the pico cell 2 and the pico cell 3.

According to the exemplary embodiment of the present invention, there is provided a method that determines to discover the cell at the inter-frequency based on the intra-frequency measurement to perform the inter-frequency measurement. Under a network environment in which traffics are preferably off-loaded to the small cell which is being operated at the inter-frequency, the number of times of performing the inter-frequency measurement required for sensing the small cell may be optimized according to the present invention. The service interruption which may occur due to the measurement gap applied for the inter-frequency measurement is reduced through such an operation to thereby improve a service quality provided to the UE.

Figure 15:
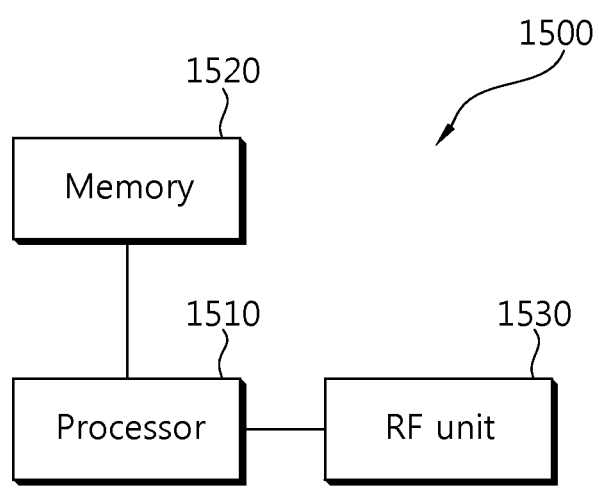
FIG. 15 is a block diagram illustrating a wireless device in which the embodiment of the present invention is implemented.

FIG. 15 is a block diagram illustrating a wireless device in which the exemplary embodiment of the present invention is implemented. This device may be implemented to perform the cell reselection method according to the exemplary embodiment of the present invention, which is described with reference to FIGS. 12 to 14.

The wireless device 1500 includes a processor 1510, a memory 1520, and an RF unit 1530. The processor 1510 implements a function, a process, and/or a method which are proposed. The processor 1510 may be configured to calculate the correlation between the wireless fingerprint information and the intra-frequency measurement result which are provided. The processor 1510 may determine whether to perform the cell discovery procedure based on the calculated correlation and perform the cell discovery procedure. The processor 1510 may be configured to perform the exemplary embodiment described with reference to FIGS. 12 to 14.

The RF unit 1530 is connected with the processor 1510 to transmit and/or receive a radio signal.

The processor may include an application-specific integrated circuit (ASIC), another chip set, a logic circuit and/or a data processing apparatus. The memory may include a read-only memory (ROM), a random access memory (RAM), a flash memory, a memory card, a storage medium, and/or other storage device. The RF unit may include a baseband circuit for processing the radio signal. When the exemplary embodiment is implemented by software, the aforementioned technique may be implemented by a module (a process, a function, and the like) performing the aforementioned function. The module may be stored in the memory and executed by the processor. The memory may be positioned inside or outside the processor and connected with the processor by various well-known means.

In the aforementioned exemplary system, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

What is claimed is:

1. An operation method for sensing a cell performed by UE in a wireless communication system, the method comprising:
   acquiring wireless fingerprint information from a network;
   acquiring an intra-frequency measurement result based on a measurement quality by performing intra-frequency measurement;
   evaluating a correlation based on the wireless fingerprint information and the intra-frequency measurement result; and
   determining whether to search for the cell based on an evaluation result for the evaluated correlation.

2. The method of claim 1,
   wherein the wireless fingerprint information includes,
   a cell identity list;
   a detection threshold;
   a correlation threshold; and
   a target frequency list.

3. The method of claim 2,
   wherein the evaluating the correlation includes:
   weighted-summing the number of cells, each of the cells being included in the cell identity list, the each of the cells being a target cell for performing intra-frequency measurement, and the measurement quality for the each of the cells being larger than the detection threshold; and
   determining that the evaluated correlation is high when the weighted-summed number of cells is larger than the correlation threshold, and
   wherein the determining whether to search for the cell includes: determining to search for the cell when it is determined that the evaluated correlation is high.

4. The method of claim 2,
   wherein the evaluating the correlation includes:
   weighted-summing difference values between at least one measurement quality for at least one cell indicated by the cell identity and a specific reference value, and
   determining that the evaluated correlation is high when the weighted-summed value on the basis of the difference values is larger than the correlation threshold, and
   wherein the determining whether to search for the cell includes: determining to search for the cell when it is determined that the evaluated correlation is high.

5. The method of claim 2,
wherein the intra-frequency measurement result includes measurement qualities for all cells indicated by the cell identity,
wherein the evaluating the correlation includes:
determining that the evaluated correlation is high when the measurement qualities for the all cells are larger than the detection threshold, and
wherein the determining whether to search for the cell includes: determining to search for the cell when it is determined that the evaluated correlation is high.

6. The method of claim 2,
wherein the intra-frequency measurement result includes at least one measurement quality for at least one cell among cells indicated by the cell identity,
wherein the evaluating the correlation includes:
determining that the evaluated correlation is high when N or more measurement qualities for N or more cells among the at least one cell is larger than the detection threshold, the N being an integer of 1 or more, and
wherein the determining whether to search for the cell includes: determining to search for the cell when it is determined that the evaluated correlation is high.

7. The method of claim 2, wherein the detection threshold is configured by at least one threshold individually applied to at least one cell included in the cell identity list.

8. The method of claim 2, wherein the detection threshold is configured by a single threshold commonly applied to at least one cell included in the cell identity list.

9. The method of claim 2,
wherein the determining whether to search for the cell includes:
performing inter-frequency measurement for at least one frequency indicated by the target frequency list of the wireless fingerprint information.

10. A wireless device that operates in a wireless communication system, the device comprising:
a radio frequency (RF) unit which transmits or receives a radio signal; and
a processor which operates in functional association with the RF unit,
wherein the processor is configured to
acquire wireless fingerprint information from a network,
acquire an intra-frequency measurement result based on a measurement quality by performing intra-frequency measurement,
evaluate a correlation based on the wireless fingerprint information and the intra-frequency measurement result, and
determine whether to search for the cell based on an evaluation result for the evaluated correlation.

11. The device of claim 10,
wherein the wireless fingerprint information includes,
a cell identity list,
a detection threshold,
a correlation threshold, and
a target frequency list.

12. The device of claim 11,
wherein the evaluating the correlation includes,
weighted-summing the number of cells, each of the cells being included in the cell identity list, the each of the cells being a target cell for performing intra-frequency measurement, and the measurement quality for the each of the cells being larger than the detection threshold, and
determining the evaluated correlation is high when the weighted-summed number of cells is larger than the correlation threshold, and
wherein the determining whether to search for the cell includes: determining to search for the cell when it is determined that the evaluated correlation is high.

13. The device of claim 11,
wherein the evaluating the correlation includes,
weighted-summing difference values between at least one measurement quality for at least one cell indicated by the cell identity and a specific reference value, and
determining that the evaluated correlation is high when the weighted-summed value on the basis of the difference values is larger than the correlation threshold, and
wherein the determining whether to search for the cell includes:
determining to search for the cell when it is determined that the evaluated correlation is high.

14. The device of claim 11,
wherein the intra-frequency measurement result includes measurement qualities for all cells indicated by the cell identity,
wherein the evaluating the correlation includes:
determining that the evaluated correlation is high when the measurement qualities for the all cells are larger than the detection threshold, and
wherein the determining whether to search for the cell includes:
determining to search for the cell when it is determined that the evaluated correlation is high.

15. The device of claim 11,
wherein the intra-frequency measurement result includes at least one measurement quality for at least one cell among cells indicated by the cell identity,
wherein the evaluating the correlation includes:
determining that the evaluated correlation is high when N or more measurement qualities for N or more cells among the at least one cell is larger than the detection threshold, the N being an integer of 1 or more, and
wherein the determining whether to search for the cell includes:
determining to search for the cell when it is determined that the evaluated correlation is high.

16. The device of claim 11, wherein the detection threshold is configured by at least one threshold individually applied to at least one cell included in the cell identity list.

17. The device of claim 11, wherein the detection threshold is configured by a single threshold commonly applied to at least one cell included in the cell identity list.

18. The device of claim 11,
wherein the determining whether to search of the cell includes:
performing inter-frequency measurement for at least one frequency indicated by the target frequency list of the wireless fingerprint information.

* * * * *